Dec. 15, 1953

J. E. LILIENFELD 2,662,995

ELECTROLYTIC CAPACITOR AND METHOD
OF FORMING THE ELECTRODES THEREOF

Filed Aug. 25, 1950

INVENTOR.
JULIUS EDGAR LILIENFELD
BY
Emery Holcombe + Blair
ATTORNEYS

Dec. 15, 1953  J. E. LILIENFELD  2,662,995
ELECTROLYTIC CAPACITOR AND METHOD
OF FORMING THE ELECTRODES THEREOF
Filed Aug. 25, 1950  3 Sheets-Sheet 2
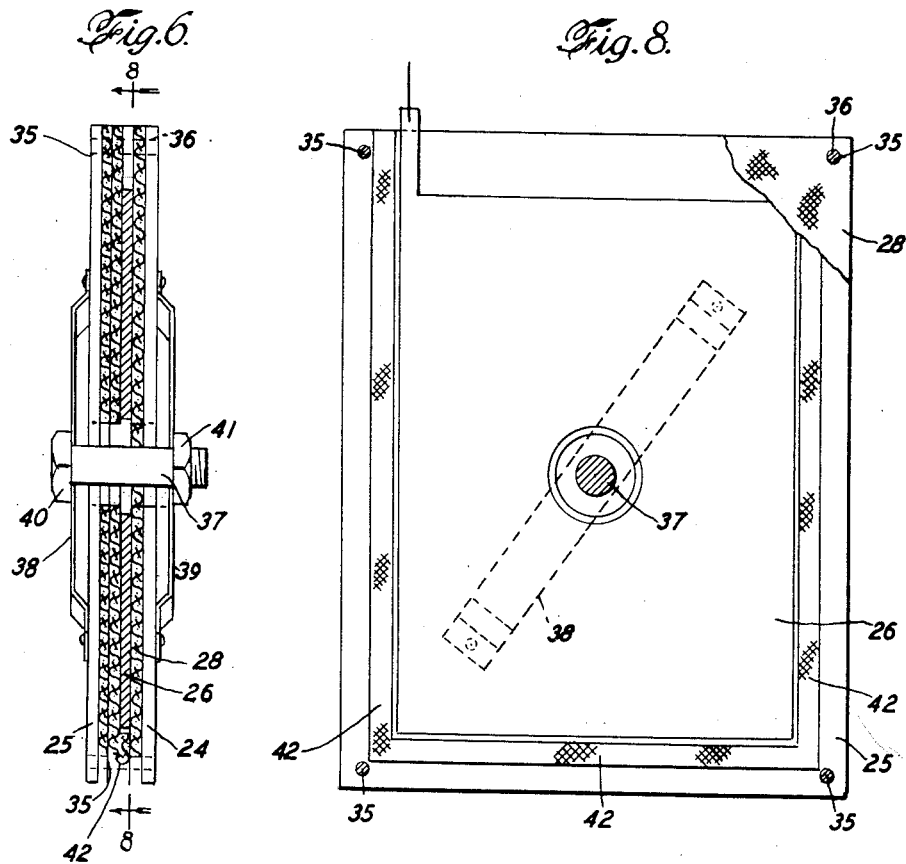
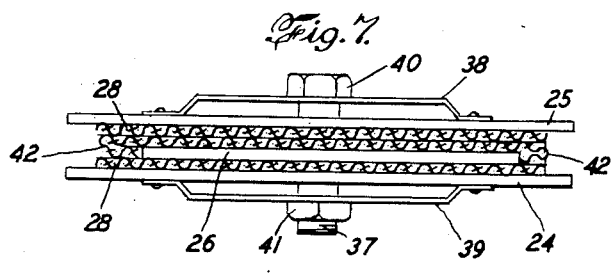
INVENTOR.
JULIUS EDGAR LILIENFELD
BY
Emery Holcombe & Blair
ATTORNEYS Dec. 15, 1953  J. E. LILIENFELD  2,662,995
ELECTROLYTIC CAPACITOR AND METHOD
OF FORMING THE ELECTRODES THEREOF
Filed Aug. 25, 1950  3 Sheets-Sheet 3
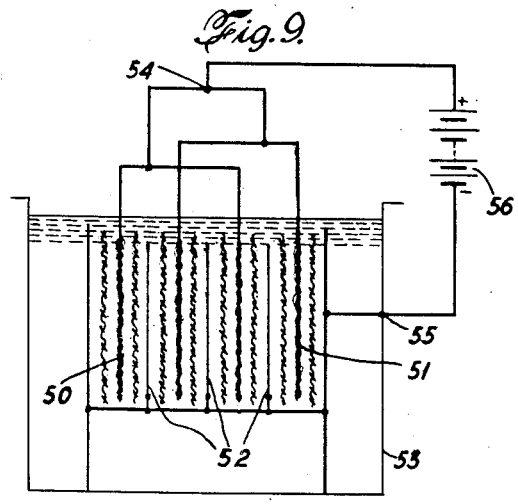
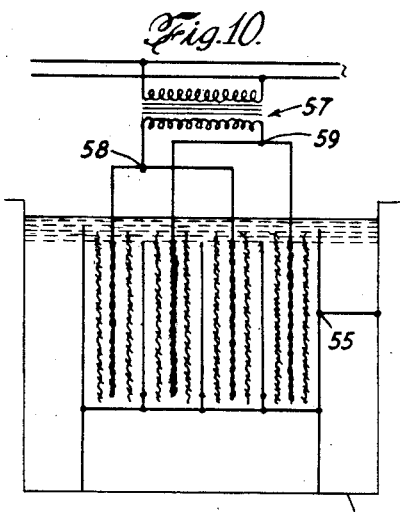
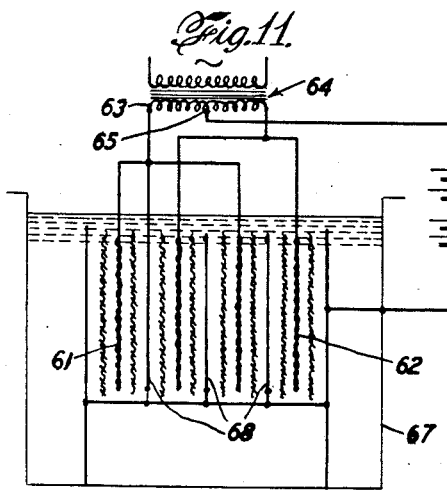
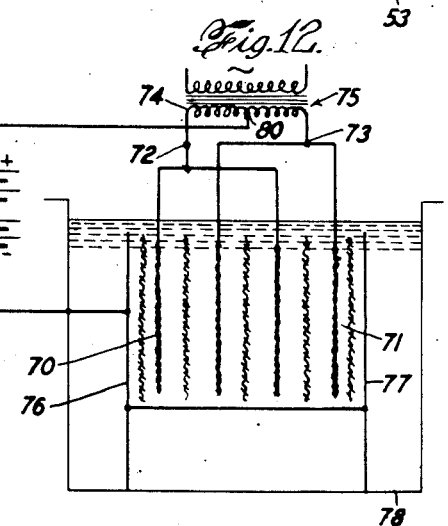
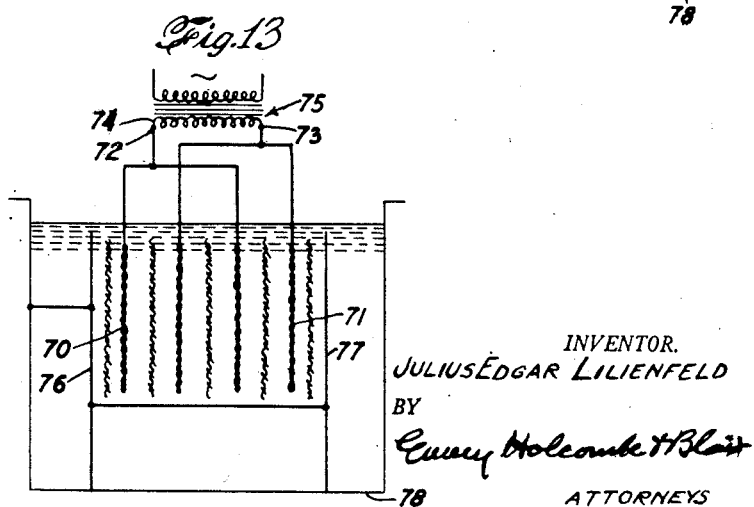
INVENTOR.
JULIUS EDGAR LILIENFELD
BY
ATTORNEYS Patented Dec. 15, 1953

2,662,995

UNITED STATES PATENT OFFICE 2,662,995

ELECTROLYTIC CAPACITOR AND METHOD OF FORMING THE ELECTRODES THEREOF

Julius Edgar Lilienfeld, St. Thomas, V. I.

Application August 25, 1950, Serial No. 181,426

5 Claims. (Cl. 317—230)

This invention relates to electrolytic capacitors and method of forming the electrodes thereof, particularly for use in connection with alternating current circuits.

In my prior Patents Nos. 1,976,700 and 2,062,464, dated October 9, 1934 and December 1, 1936, respectively, relating to the formation of dielectric films on aluminum electrodes, various expedients are mentioned for forming such films and for reducing the resistance of pure boric acid as an electrolyte, but the application of such films to capacitors for operation on alternating current circuits was not envisaged by me at that time.

In the art of producing and applying to various purposes dielectric films on aluminum, it has been proposed to use the dielectric properties of such films in the construction of capacitors. However, in making use of such capacitors on oscillating voltages (A. C. networks) it was realized that, the films being of an anodic character, the aluminum electrode acts as a rectifier upon the reversal of its polarity, and consequently some provision had to be made to avoid the breakdown of the film which occurs when the electrode becomes negative with respect to the electrolyte and the film thus loses its dielectric property. Means to cope with this problem, which appear as theoretically sound, are indicated in the U. S. Patent to Moscicki No. 926,128. However, it was observed that a progressive deterioration of the film occurs when capacitors of this nature are placed in operation in A. C. networks even though such means be applied. Hence these Moscicki-type capacitors did not find a place in commercial use.

Failure to comprehend the physicochemical nature of the deterioration of the dielectric film on aluminum as it occurs in A. C. operation of such capacitors explains the lack of success of prior attempts to utilize filmed aluminum for this purpose.

The present invention has its basis in the conception that, while a capacitor constructed according to the aforesaid Moscicki patent provides at all times for a positive potential of the aluminum metal relative to the electrolyte, the patent ignores the electrochemical processes occurring at the outer face of the dielectric film in the presence of an alternating potential and their effect on the film.

It is my conclusion that, regardless of the filmed electrodes being positively biased, they are alternately subjected throughout the condenser operation to the same deteriorating physicochemical process as would be the case if they were operated as cathodes alternatively on a unidirectional voltage, and that this operation is responsible for the progressive deterioration of the dielectric film. I conceived that this is so because, in the interval of the cycle in which the filmed electrode potential drops from peak plus (+) to peak minus (—), the outer face of the dielectric film loses negative charges, conveyed by anions, and acquires positive charges which are conveyed by cations. Such is the identical condition under which the film on the active electrode of an aluminum rectifier loses its dielectric property, breaks down and permits the current to flow in the reverse direction.

The deterioration of filmed electrodes cannot be accounted for by the release of such anions as had been retained during the preceding half cycle—from a peak minus (—) value to a peak plus (+) value—at the outer face of the electric field across the dielectric, and from this I conclude that it is the deposition of cations upon the outer face of the dielectric of an electrolytic condenser electrode—occurring when the outer face of the film does not supply the needed anions—which is to be regarded as the primary cause of the dielectric deterioration. I have discovered, however, that there is one cation which is not detrimental in its action upon the dielectric film, viz: the hydrogen cation. I have further discovered that cations of the metals of the alkali metal group including ammonium ($NH_3$) are among the harmful ones. The present invention is concerned with the use of an electrolyte in which substantially only hydrogen cations are present and active.

One of the electrolytes suitable for use in condensers and of the aforesaid kind, to wit: having substantially only hydrogen cations, is an aqueous boric acid solution of high concentration. However, this electrolyte has the disadvantageous property of a high specific resistance which is of the order of 10,000 ohms per $cm^3$. The disadvantages of such high specific resistance are to be avoided by reducing the spacing between the electrodes as much as feasible, thus providing as short a path as possible for the flow of the current. It is well known that such minute spacing cannot be obtained economically except by inserting between the electrodes a thin, porous, absorbent spacer of an insulating fibre. Such spacer has to possess two properties in order to make an efficient condenser. First, contamination of the electrolyte with the aforesaid harmful cations must be avoided. For instance, glass fibre of the conventional soft glass is not permissible inasmuch as it is known that it produces a very noticeable alkalinity in contact with water.

Secondly, the spacer has to be chemically inert so as not to be affected by occurrences during the operation of the condenser, for instance, not to be affected in case of a flash-over occasioned by an incidental voltage surge. Consequently, cotton gauze, even though it may be obtained in a substantially alkaline-free state, is to be excluded because in a percentage of cases of such flash-over it becomes carbonized and contaminates the filmed electrodes to the extent that one of the most desirable properties of the electrolytic condenser disappears, to wit: the self-healing property of the film.

In accordance with my invention, the spacer element is made of silica fibre or the fibre of such hard glasses, e. g., boron glasses like Pyrex, as do not yield the aforesaid harmful cations. Such spacers may be in the form of a woven fabric, or of a mat of a feltlike nature.

The aforesaid novel combination of electrolyte and spacer also makes possible the pre-formation of the film partly or wholly on an alternating current while the customary pre-formation always is done on direct current. The reason for the latter is that in alkaline electrolytes the aluminum acts as a rectifier and the layer produced by the positive phase of an alternating current will be destroyed by the negative phase. This rectifier action is to a large extent obviated in an alkali-free electrolyte so that film formation occurs with an alternating component in the formation voltage when the latter is preponderant over the direct component; and even an alternating voltage solely will in a measure form a film. From this it follows that a film formation on narrowly spaced electrodes may be accomplished by using oscillating voltage either with or without a direct voltage component.

This makes possible the assembly of the condenser structures without preforming the electrodes to be filmed and to film them in situ in the assembled pack. It is well known in the art that condensers are now made by first filming the condenser electrodes proper and then assembling, stacking or rolling, the condenser. This technique is used for more than one reason. First, because very often it has been realized that it is desirable to film the electrodes in one electrolyte and to distribute the capacitors for use in a different electrolyte. Another reason is that for engineering considerations it is most practical to mount the filmed electrodes on the cover of the prospective container and then to assemble cover and containers in the next step. Another reason is that if the condenser is of the rolled type with a cotton cambric separator, it is not practical, because of the aforesaid considerations, to form it in the assembled condition.

An important condition to be fulfilled in assembling filmed condenser electrodes with any kind of fibrous spacers, and most particularly with spacers of the aforesaid acceptable fibres, is to limit the pressure arising at the contact area between the film and the fibre to such values as would not fully displace the electrolyte clinging by adhesion to the surfaces. Contact areas of too high a pressure always arise, e. g., in stacked condenser assemblies, if metal foil plate are sandwiched with interleaved spacer sheets and held in position by a compressing mechanism. My invention avoids this by inserting the plates in pocket-like configurations, the pockets being reinforced about the edges, with the effect that the pressure is exerted only about said edges and so is released from the film. Thus, the plates inserted in said pockets are only loosely contacting the fibre; and experience shows that no disturbance arises from such loose contact.

The aforesaid pocketlike structure may be effected by the insertion of a U-shaped frame paralleling at a small distance the filmed plates. Again, it may be produced by hemming the edges of the spacers proper. It is also feasible to do it by shims inserted at the corners of the structure.

The nature of the invention will be further understood in connection with the description of the specific embodiment shown in the accompanying drawings, in which:

Fig. 6 is an elevational view partly in section of the electrode pack assembly for the capacitor; and Fig. 7 is a plan thereof;

Fig. 8 is a vertical section through the pack assembly taken on the line 8—8, Fig. 6.

Figs. 9 and 10 are wiring diagrams illustrating respectively the electrical connections involved in the formation of the filmed electrodes of one form of the novel capacitor, and the connections for operating the same on oscillating voltages.

Fig. 11 is a similar view illustrating the electrical connections for formation and operation of the capacitor simultaneously.

Figs. 12 and 13 are similar views illustrating respectively the electrical connections for forming the filmed electrodes of another form of the capacitor, and the electrical connections for operating the same on oscillating voltages.

Figure 1:
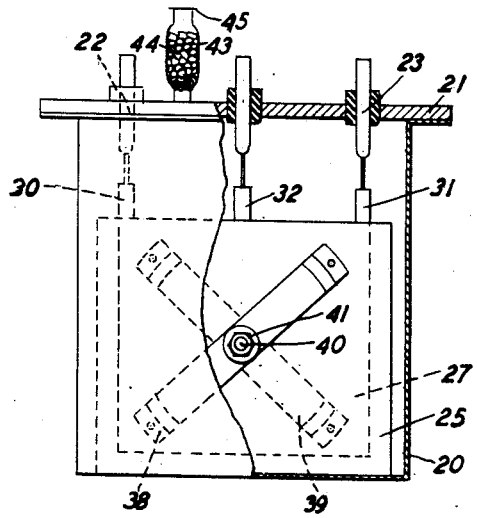
Fig. 1 is a front elevation of the novel capacitor with part of the front wall removed to disclose the electrode pack assembly, portions of the electrolyte receptacle and cover being in vertical section.
Figure 2:
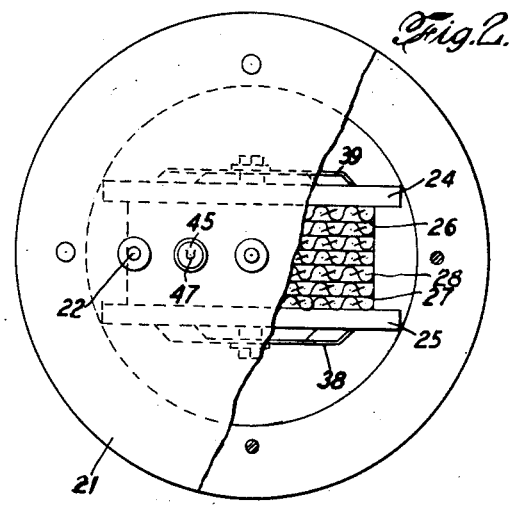
Fig. 2 is a plan view of the capacitor with part of the receptacle cover broken away.
Figure 5:
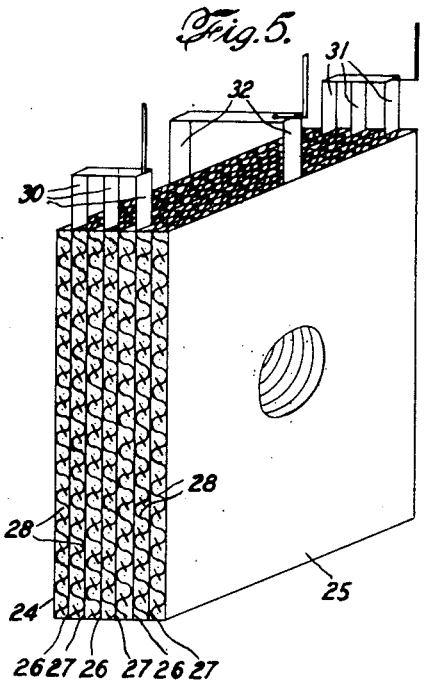
Fig. 5 is a schematic view in isometric projection of the novel electrode pack assembly.
Figure 3:
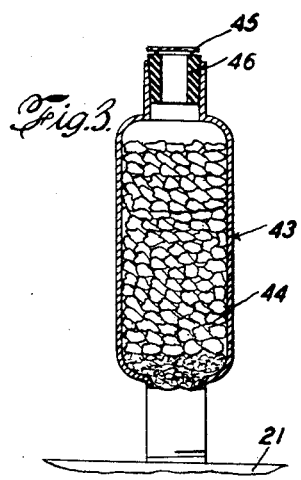
Fig. 3 is a fragmentary front elevation of the upper portion of the capacitor with the venting member shown in vertical section, on an enlarged scale.
Figure 4:
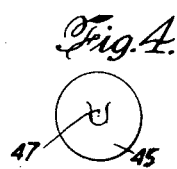
Fig. 4 is a plan view of the venting member cap.

Referring to the drawings, more particularly Figs. 1–5, the novel capacitor is illustrated more or less schematically as comprising a generally metallic container or receptacle 20 for the electrolyte and electrodes. A cover 21 serves to close the receptacle and carries two or more terminal members 22 and 23 for the respective electrodes. The latter are provided in a pack form arrangement shown schematically in Fig. 5. Such pack assembly, for example, comprises a pair of end plates 24 and 25, preferably made of copper or non-filmed aluminum, between which are held a succession of electrode sets 26 and 27 interleaved with spacer elements 28. The said electrodes may all be of the filmed aluminum type or a set of filmed electrodes may be interleaved with a set of non-filmed electrodes. Thus, as is indicated in Fig. 5, the even-numbered electrodes 26 are of the former type and have their respective terminals 30 all united electrically, while the other and odd-numbered electrodes 27 are of the non-filmed type and likewise have all of their terminals 31 electrically united. Terminals 32 are also provided for the end plates 24, 25. Said end plates 24 and 25 are preferably of somewhat larger dimensions than the electrodes so as to provide a protective marginal border about the same, as is more clearly indicated in Figs. 1 and 2 of the drawings.

This arrangement not only provides for electrical contact of said end plates with the container 20 but also locates positively the pack assembly within such container. This allows of assembling the electrodes of the capacitor prior to the formation or filming of the electrodes 26 in situ as they are in the pack; and the formation may be performed either with the pack in its container 20 or externally thereof.

A more detailed showing of the pack assembly is set forth in Figs. 6 to 8, only one anode and corresponding separators being shown for the sake of simplicity. The various elements of said pack as shown are properly located by means of positioning pins 35 passing through registering openings 36 in the marginal portion of the respective end plates 24, 25. When thus registered, a bolt 37 passing axially through the various electrodes and plates is caused to press them together into the pack form shown; and, to provide for a resilient pressure thereon, spring elements 38 and 39 may be inserted between the head of the bolt 40 and end plates 24, 25 and the tightening nut 41, respectively.

In order to limit the pressure arising at the contact area between the film and the fabric separators of the pack, the filmed electrodes are arranged for insertion in pocket-like configurations made of the separator material 28. Thus, as is indicated, these pocket-like configurations may be constructed to provide at two opposite edges, or along three edges, a U-shape reinforcement, as by forming a hem 42 thereat within which the pocket so formed an electrode is adapted to be inserted. While this expedient does not relieve entirely the pressure exerted upon an electrode thus retained, it nevertheless prevents excessive pressure in parts of the filmed area of an electrode.

As hereinbefore noted, in forming the electrodes of the pack assembly in situ, an electrolyte is utilized which is substantially free of ionogens of the alkali metal group including ammonium; and one such electrolyte suitable for this purpose is a substantially pure aqueous and saturated solution of boric acid.

The material constituting the spacer elements of the condenser pack is preferably of an inorganic nature but must be substantially free from any ionogens of alkaline nature. I have found silica fibre or the fibre of such hard glasses as boron glass particularly suitable in this respect; and the same may be in the form of a woven fabric or of a mat of a feltlike nature.

The aforesaid filming of the electrodes of the pack in situ may be effected in a special formation tank and then placed in the final container of the capacitor. Or, it may be formed in said container itself. As a final step in the manufacture of these condensers, the container is closed by an airtight fitting cover which, however, must be provided with a suitable venting valve to equalize the interior pressure with that of the atmosphere. It is to be noted that the atmosphere, particularly in manufacturing districts, contains not only the ammonium designated as objectionable hereinbefore, but other objectionable gases such as chlorine, sulfur dioxide, etc. In order to exclude such contaminating gases, an absorption chamber 43 is fitted to, for example, the cover of the container and filled with an adequate absorbent such as activated charcoal 44, or equivalent means for selectively absorbing such contaminating gases from the entering air. In the claims the term "selective gas absorbing means" is used to define activated charcoal and equivalent means for selectively absorbing such objectionable gases as chlorine, sulfur dioxide and the like from the air. Furthermore, the outer orifice of the absorption chamber is equipped with a two-way valve to prevent ingress of these gases as well as to relieve the internal pressure. The valve shown is of novel type, consisting of an elastic member such as live rubber fitted airtight to the top of the orifice. This may be effected by cementing a disk 45 of the rubber membrane, for example, to a bored rubber stopper 46 inserted into the outlet orifice of the chamber. The membrane is then provided with a non-rectilinear cut which affords a flap 47 acting as the valve element.

The formation of an electrode may be effected purely on direct current or on an oscillating current superimposed on direct current, or wholly on an alternating current, the latter being feasible to a degree because of the aforesaid particular nature of the electrolyte utilized. Reference being had to Fig. 9, two sets 50 and 51 of filmed electrodes and a set 52 of non-filmed electrodes interleaved therewith are shown, the latter set being connected to the container 53. In this embodiment, for the formation operation, all of the filmed electrodes 50, 51 are to be interconnected as shown and similarly the non-filmed electrodes 52. The terminals 54 and 55 respectively of the two interconnected groups are then connected to a source 56 of direct current, the former terminal 54 to the positive terminal of said source and the latter terminal 55 to the negative terminal thereof. After formation, the capacitor may be operated on an oscillating current represented by the transformer 57, Fig. 10, the interconnection of the filmed electrodes having been interrupted and terminals 58, 59 then connected to the secondary of said transformer, while the terminal 55 of the set of non-filmed electrodes remains connected to the container 53.

In the case of formation by the superimposition of direct current on an oscillating current, Fig. 11, the two sets 61 and 62 of interconnected filmed electrodes are connected respectively to the two terminals of the secondary 63 of a transformer 64. The mid-point 65 of this secondary is then connected to the positive terminal of a source 66 of direct current, the negative terminal of which is connected to the container 67 in turn connected to the interconnected set of non-filmed electrodes 68 interleaved with the sets of filmed electrodes. When the formation is completed, the capacitor is operating on an oscillating current with a bias provided by the battery 66. In the case of the operation of the capacitor shown in Fig. 10, such bias is absent.

In Figs. 12 and 13, capacitors are illustrated in which no interleaved non-filmed electrodes are provided. In the former embodiment, sets 70 and 71 of filmed electrodes are connected to the respective terminals 72, 73 of the secondary 74 of a transformer 75; and the non-filmed end plates 76, 77 are interconnected as well as connected to the container 78 and from it to the negative terminal of a source 79 of direct current. The positive terminal of this source is then connected to the mid-point 80 of transformer secondary 74. This reduces materially the time of formation. In operation, after the formation has been completed, the capacitor may be operated without the direct current source 79, as is indicated in Fig. 13.

The invention is not restricted to the several embodiments illustrated.

I claim:

1. An electrolytic condenser comprising a plurality of electrodes at least one of which is filmed, insulating means over opposite faces of a filmed electrode, and marginal insulating spacers between the respective insulating means to provide a channel therebetween for accommodating freely the filmed electrode, and means to exert pressure only upon the marginal spacers for integrating the elements into an individual assembly.

2. An electrolytic condenser according to claim 1, wherein the insulating means is a pocket-like element of fibre adapted to receive a filmed electrode.

3. An electrolytic condenser according to claim 2, wherein the pocket-like element is provided with insulating reinforcements increasing the thickness along edges thereof.

4. An electrolytic capacitor comprising electrodes, at least one of which is of a filmed metal, and a gas-sealed container for electrolyte having a breathing channel therein; a valve associated with said channel for equalizing the pressure within the container with that of the external atmosphere, selective gas-absorbing means in series with said valve to intercept gaseous flow passing inwardly through the valve, and an electrolyte substantially free from ionogens of the alkali metal group including ammonium retained by the container and into which the capacitor electrodes dip, whereby said electrolyte is kept sufficiently free of impurities for effectively maintaining the character of the filmed electrode.

5. An electrolytic capacitor as defined by claim 4 wherein the valve consists of an elastic membrane provided with a curved cut therethrough forming a movable flap.

JULIUS EDGAR LILIENFELD.

References Cited in the file of this patent

UNITED STATES PATENTS

| Number | Name | Date |
|---|---|---|
| 1,388,874 | Mershon | Aug. 30, 1921 |
| 1,843,622 | Norton | Feb. 2, 1932 |
| 1,950,119 | Lilienfeld | Mar. 6, 1934 |
| 1,976,700 | Lilienfeld | Oct. 9, 1934 |
| 2,057,315 | Robinson | Oct. 13, 1936 |
| 2,062,464 | Lilienfeld | Dec. 1, 1936 |
| 2,099,599 | DeLange | Nov. 16, 1937 |
| 2,099,797 | Clark | Nov. 23, 1937 |
| 2,125,373 | Georgiev | Aug. 2, 1938 |
| 2,183,091 | Claassen | Dec. 12, 1939 |
| 2,290,163 | Brennan | July 21, 1942 |
| 2,290,997 | Robinson | July 28, 1942 |
| 2,297,607 | Blackburn | Sept. 29, 1942 |
| 2,310,932 | Brennan | Feb. 16, 1943 |